(12) United States Patent
Pandey et al.

(10) Patent No.: US 8,647,067 B2
(45) Date of Patent: Feb. 11, 2014

(54) BANKED PLATFORM TURBINE BLADE

(75) Inventors: Vidhu Shekhar Pandey, West Chester, OH (US); Jeffrey Donald Clements, Mason, OH (US); Ching-Pang Lee, Cincinnati, OH (US)

(73) Assignee: General Electric company, Schenectady, NY (US)

( * ) Notice: Subject to any disclaimer, the term of this patent is extended or adjusted under 35 U.S.C. 154(b) by 1320 days.

(21) Appl. No.: 12/330,783

(22) Filed: Dec. 9, 2008

(65) Prior Publication Data

US 2010/0143139 A1 Jun. 10, 2010

(51) Int. Cl.
*B63H 1/26* (2006.01)
*B63H 1/16* (2006.01)

(52) U.S. Cl.
USPC ............... 416/223 R; 416/193 A; 416/193 R (58) Field of Classification Search
USPC ............... 416/223 R, 193 A, 193 R, 190, 192
See application file for complete search history.

(56) References Cited

U.S. PATENT DOCUMENTS

| | | | |
|---|---|---|---|
| 4,778,338 A | 10/1988 | Bessay | |
| 5,397,215 A | 3/1995 | Spear et al. | |
| 6,017,186 A | 1/2000 | Hoeger et al. | |
| 6,283,713 B1 | 9/2001 | Harvey et al. | |
| 6,419,446 B1 | 7/2002 | Kvasnak et al. | |
| 6,511,294 B1 | 1/2003 | Mielke et al. | |
| 6,561,761 B1 | 5/2003 | Decker et al. | |
| 6,669,445 B2 | 12/2003 | Staubach et al. | |
| 6,837,679 B2 | 1/2005 | Kawarada et al. | |
| 7,134,842 B2 | 11/2006 | Tam et al. | |
| 7,217,096 B2 | 5/2007 | Lee | |
| 7,220,100 B2 | 5/2007 | Lee et al. | |
| 7,249,933 B2 | 7/2007 | Lee et al. | |
| 2006/0140768 A1* | 6/2006 | Tam et al. ................ | 416/193 A |
| 2006/0233641 A1* | 10/2006 | Lee et al. ................ | 415/208.1 |
| 2007/0258810 A1 | 11/2007 | Aotsuka et al. | |
| 2007/0258818 A1* | 11/2007 | Allen-Bradley et al. . | 416/193 A |
| 2010/0158696 A1* | 6/2010 | Pandey et al. ................ | 416/243 |
| 2010/0166658 A1* | 7/2010 | Cotty et al. .................... | 424/9.1 |

FOREIGN PATENT DOCUMENTS

| | | |
|---|---|---|
| EP | 1681438 A2 | 7/2006 |
| EP | 1712737 A1 | 10/2006 |

OTHER PUBLICATIONS

International Search Report and Written Opinion issued in connection with PCT/US2009/065361, Sep. 17, 2010.
Harvey et al, "Non-Axisymmetric Turbine End Wall Design: Part I Three-Dimensional Linear Design System," ASME 99-GT-337, Jun. 1999, pp. 1-9.

* cited by examiner

*Primary Examiner* — Nitin Parekh
(74) *Attorney, Agent, or Firm* — William Scott Andes; Trego, Hines & Ladenheim, PLLC (57) ABSTRACT

A turbine blade includes an airfoil and integral platform at the root thereof. The platform is contoured in elevation from a bank adjacent the pressure side of the airfoil to a trough commencing behind the airfoil leading edge.

26 Claims, 5 Drawing Sheets

BANKED PLATFORM TURBINE BLADE

The U.S. Government may have certain rights in this invention pursuant to contract number W911 W6-07-2-0002 awarded by the U.S. Department of the Army.

BACKGROUND OF THE INVENTION

The present invention relates generally to gas turbine engines, and, more specifically, to turbines therein.

In a gas turbine engine, air is pressurized in a compressor and mixed with fuel in a combustor for generating hot combustion gases. Energy is extracted from the gases in turbine stages which power the compressor and a shaft that typically drives a fan in an aircraft turbofan engine application.

A high pressure turbine (HPT) directly follows the combustor and receives the hottest gases therefrom from which energy is initially extracted. A low pressure turbine (LPT) follows the HPT and extracts additional energy from the gases.

As energy is extracted from the gases in the various turbine stages, the velocity and pressure distributions correspondingly vary, which in turn requires correspondingly different aerodynamic profiles of the turbine stator vanes and rotor blades. The size of the vanes and blades typically increases in the downstream direction for providing more surface area to extract energy from the combustion gases as the pressure thereof decreases.

The velocity of the gases also decreases as energy is extracted and the flowpath area increases, which in turn leads to changes in the span and thickness aspect ratios of the vanes and blades and corresponding camber thereof.

Fundamental to turbine efficiency is the aerodynamic performance of the individual turbine airfoils as the combustion gases are split along the leading edges thereof for corresponding flow along the generally concave pressure side of the airfoil and the generally convex suction side thereof. Differential pressure is effected between the opposite airfoil sides, and aerodynamic contour or camber of the airfoil is optimized for maximizing differential pressure without undesirable flow separation of the gases over the suction side.

The turbine flowpath is defined circumferentially between adjacent airfoils as well as radially between inner and outer flowpath surfaces. For the turbine nozzle, inner and outer bands integral with the vanes bound the flow. And for the turbine blades, radially inner platforms and radially outer tip shrouds bound the combustion gases.

A particular problem affecting turbine efficiency is the generation of undesirable vortices as the combustion gases are split along the airfoil leading edges near a flow boundary, such as the radially inner blade platforms. Two horseshoe vortices flow downstream on opposite sides of each airfoil and create undesirable turbulence in the flow. This turbulence can increase platform heating. And, migration of the vortices radially outwardly can decrease turbine efficiency.

The outer and inner flowpath boundaries in the typical gas turbine engine are axisymmetrical with constant diameter or radius from the axial centerline axis of the engine. The blade platforms, for example, are therefore axisymmetric with uniform circumferential curvature from their upstream forward ends to their downstream aft ends notwithstanding any axial inclination or slope thereof.

In previous turbine developments, it is known to selectively contour the flowpath boundaries to minimize the adverse affects of the horseshoe vortices. However, due to the complex three dimensional (3D) configuration of the turbine stages and the correspondingly complex 3D distributions of the velocity, pressure, and temperature of the combustion gases contouring of the flowpath boundaries is equally complex and is directly affected by the specific design of the specific turbine stage.

Accordingly, known flowpath contouring is highly specific to specific turbine stages and is not readily transferable to different stages whose efficiency and performance could instead be degraded.

Flowpath contouring has been applied initially to turbine blades in the HPT in view of their large effect on engine efficiency. However, further improvements in engine efficiency may be obtained by developing specific flowpath contouring for the differently configured turbine blades in the LPT.

Accordingly, it is desired to provide platform cooling in an LPT for further improving engine efficiency.

BRIEF DESCRIPTION OF THE INVENTION

A turbine blade includes an airfoil and integral platform at the root thereof. The platform is contoured in elevation from a bank adjacent the pressure side of the airfoil to a trough commencing behind the airfoil leading edge.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
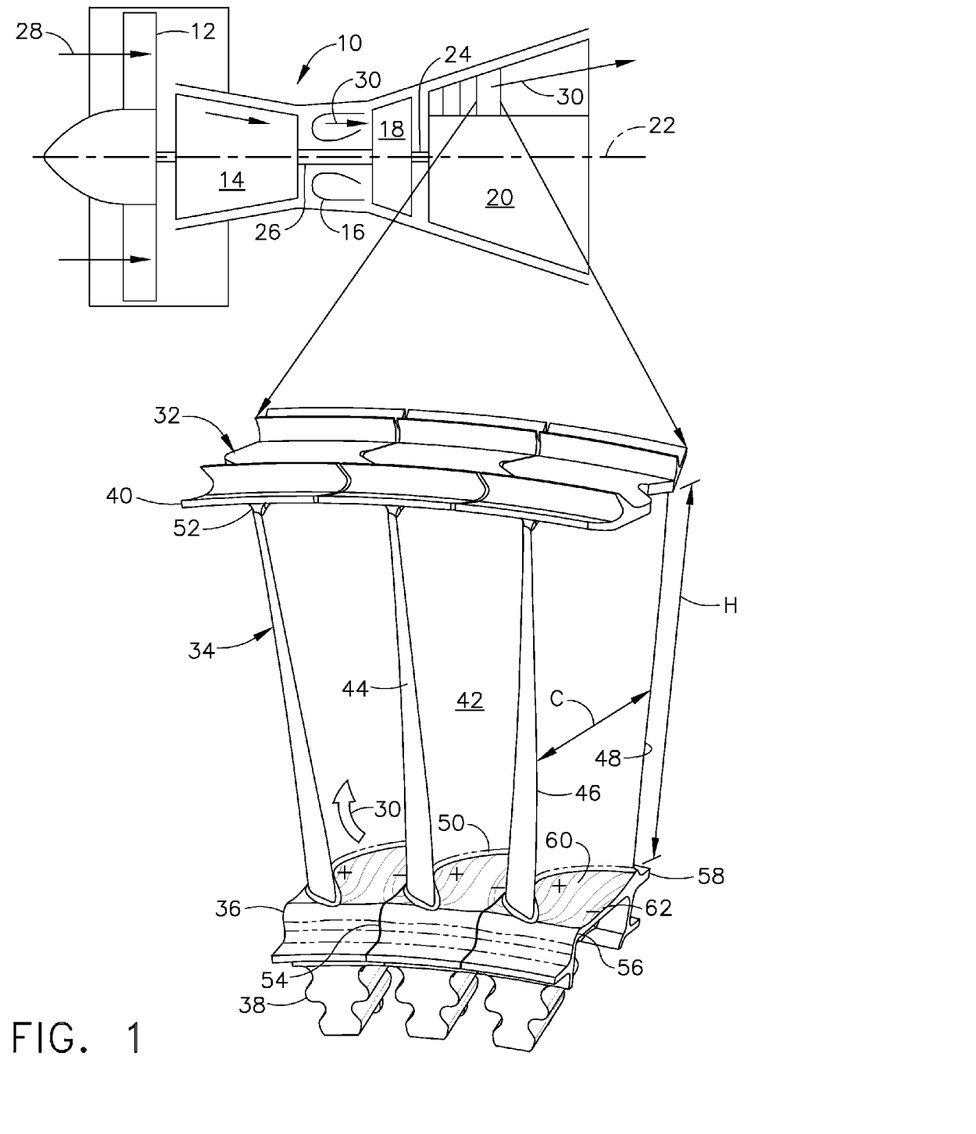
FIG. 1 is a schematic view of an exemplary gas turbine engine having slender turbine blades in a second stage of the LPT thereof.

Illustrated schematically in FIG. 1 is an exemplary turbofan gas turbine engine 10 configured for powering an aircraft in flight. The engine includes in serial flow communication a fan 12, compressor 14, combustor 16, high pressure turbine (HPT) 18, and low pressure turbine (LPT) 20 disposed coaxially about a common axial or centerline axis 22.

The compressor, HPT, and LPT include corresponding stages of stator vanes and rotor blades, with the rotor blades of the LPT 20 being joined to a first drive shaft 24 which in turn is joined to the rotor blades of the fan 12 for rotation thereof.

The rotor blades of the HPT 18 are joined by a second drive shaft 26 to the rotor blades of the compressor 14 for rotation thereof during operation.

During operation, ambient air 28 enters the fan 12 and is pressurized thereby, with an inner portion of the pressurized air being channeled through the compressor 14 for further pressurization after which it is mixed with fuel in the combustor 16 and ignited for generating hot combustion gases 30.

The airfoils of the compressor 14 are suitably configured for imparting energy into the air for pressurization thereof, whereas the airfoils of the HPT 18 and LPT 20 are differently configured for expanding the combustion gases 30 during operation for extracting energy therefrom to power the compressor 14 and fan 12 correspondingly.

The LPT 20 illustrated in FIG. 1 has multiple stages in accordance with conventional practice, and in particular includes a row of second stage turbine blades 32 following a corresponding second stage stator nozzle, which in turn follows the first stage nozzle and blades of the LPT.

Each second stage LPT rotor blade 32 includes a slender airfoil 34 integral joined at its radially inner end to a platform 36 in turn joined to an integral axial dovetail 38, with a tip shroud 40 integrally joined to the radially outer end of the airfoil in a typical one-piece or unitary metal casting.

Figure 2:
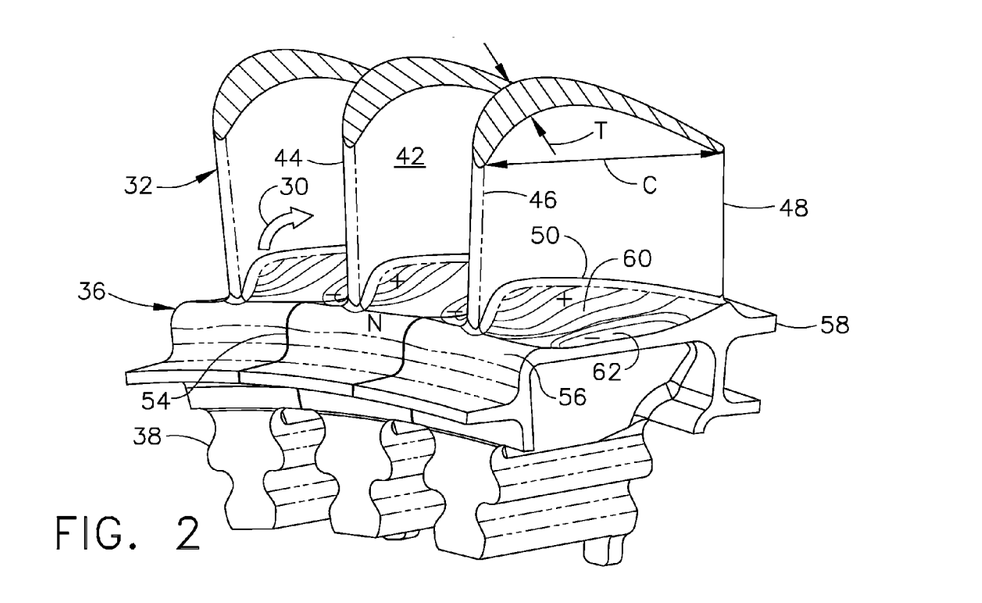
FIG. 2 is an isometric view of the lower portion of the exemplary LPT blades illustrated in FIG. 1 having contoured blade platforms shown looking aft from the airfoil pressure sides.

The exemplary airfoils illustrated in FIGS. 1 and 2 have circumferentially or laterally opposite pressure and suction sides 42,44 which extend axially in chord (C) between opposite leading and trailing edges 46,48. The airfoil also extends radially in height or span between a radially inner root 50 integrally joined to the platform 36, and a radially opposite tip 52 which is integrally joined to the tip shroud 40.

Each platform 36 is generally rectangular in perimeter and extends circumferentially or laterally outwardly from both pressure and suction sides 42,44. Each platform has circumferentially opposite lateral edges defined by corresponding axial splitlines 54 between which is typically mounted corresponding spline seals (not shown).

Each platform commences at an external rounded corner or arcuate bullnose 56 at the forward end thereof, which bullnose extends radially inwardly directly from the airfoil leading edges to minimize or eliminate any forward extension of the platform. The platform defines the radially inner boundary for flowpath wall for the combustion gases channeled thereover during operation.

Each platform terminates at its axially aft end in a circumferential land or lip 58 extending aft from the airfoil trailing edges 48. The lip 58 provides an aft extension for the platform 36, whereas the forward bullnose 56 eliminates any forward extension of the platform as required for the specific configuration of the turbine blade 32 in its second stage location in the LPT 20. Below the bullnose 56 is a conventional angel wing, and below the lip 58 is another conventional angel wing, which angel wings effect the labyrinth seals with the corresponding stator nozzles in the LPT in the conventional manner.

During operation, the combustion gases 30 are first received by the second stage LPT blades 32 at the leading edges thereof, directly above the forward bullnose 56, and channeled aft over the platforms through the inter-airfoil flowpaths for discharge from the airfoil trailing edges aft over the cantilevered lips 58 extending aft therefrom.

Since the turbine blade 32 is specifically configured for its second stage location in the LPT 20, the airfoil 34 is slender in span, and typically includes the integral tip shroud 40 integrally joined to the airfoil tip 52. Both the platform 36 and tip shroud 40 extend laterally oppositely from the opposite pressure and suction sides of the airfoil for defining corresponding portions of the radially inner and outer flowpath boundaries for the combustion gases.

As shown in FIG. 1, the airfoil 34 is slender with a span aspect ratio of its radial height H to its average chord length C greater than about 3.0 and up to about 8.0. The tall airfoil is also relatively thin with a corresponding thickness aspect ratio in which the airfoil thickness T has a maximum value divided by the average chord length C, which ratio is less than about 0.3 and down to about 0.1 to about 0.15.

In other words, the large LPT blades 32 are relatively tall, slender, and thin when compared with the relatively short and thick smaller blades of the HPT which are outside these aspect ratios of span and thickness. Note further that the LPT airfoils 34 are also solid without any internal cooling channels as typically found in the thicker turbine blades of the HPT which require corresponding internal cooling for withstanding the higher temperature combustion gases in the early turbine stages, which temperature decreases substantially through the LPT.

Figure 3:
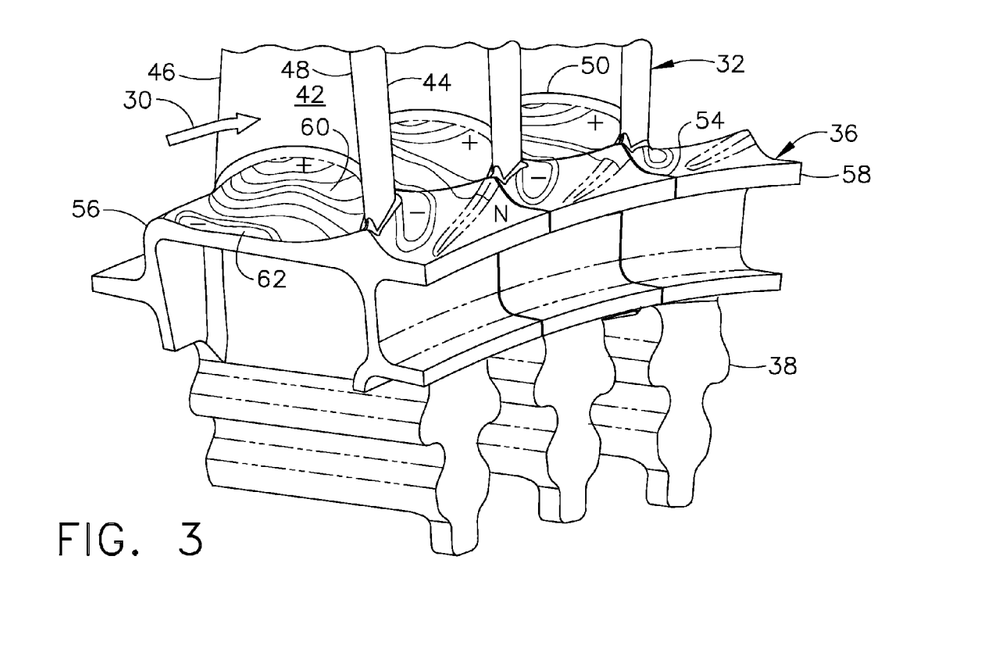
FIG. 3 is an isometric view of the exemplary turbine blades illustrated in FIG. 2 shown looking forward toward the airfoil pressure sides.

As initially shown in FIGS. 2 and 3, each platform 36 is preferentially contoured in elevation relative to the conventional axisymmetric or circular circumferential profile thereof for reducing the adverse affects of the vortices generated as the combustion gases 30 split around the airfoil leading edges 46 as they flow downstream over the platform during operation. In particular the platform contour is non-axisymmetric, but is instead contoured in radial elevation from a wide mound or elevated bank 60 adjacent the airfoil pressure side 42 to a depressed narrow bowl or trough 62.

Collectively, the elevated bank and depressed trough provide an aerodynamically smooth chute or curved flute that follows the arcuate contour of the flowpath between the concave pressure side of one airfoil and the convex suction side of the adjacent airfoil to smoothly channel the combustion gases therethrough.

Figure 4:
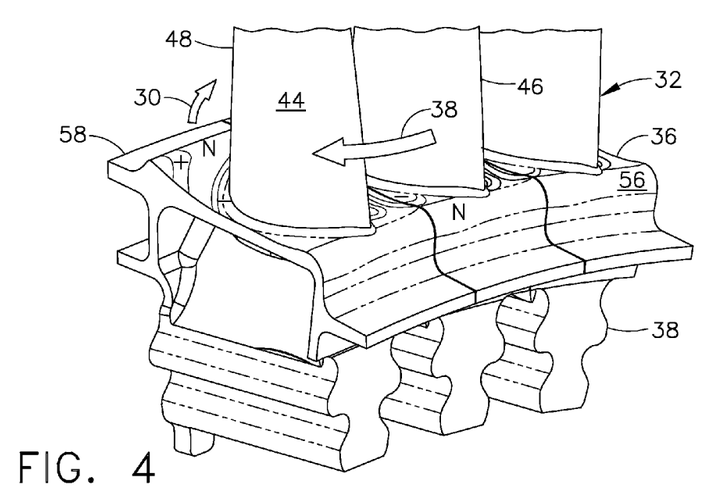
FIG. 4 is an isometric view of the turbine blades illustrated in FIG. 2 looking aft from the airfoil suction sides.
Figure 5:
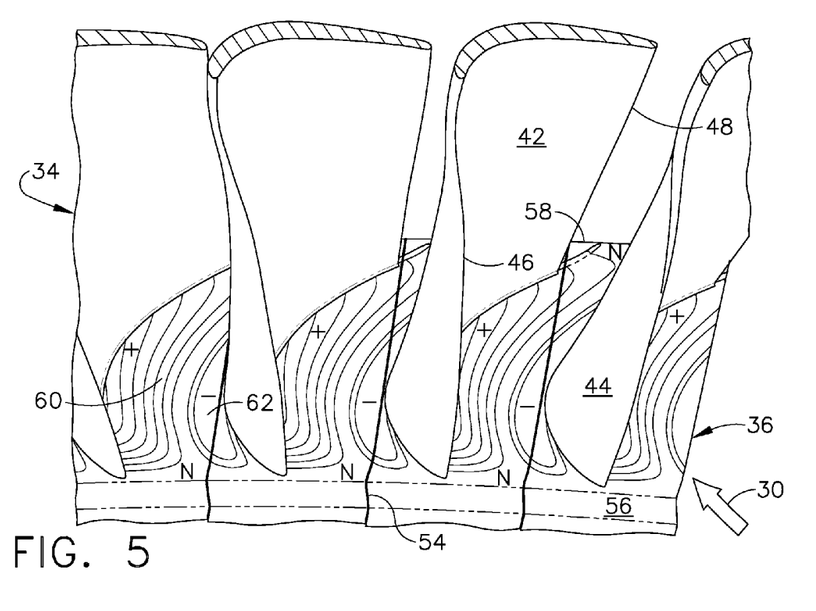
FIG. 5 is an isometric view of the turbine blades illustrated in FIG. 2 looking radially inwardly in planiform view.

FIGS. 2 and 3 illustrate flow of the combustion gases 30 over the pressure sides 42 of the airfoils, with FIG. 4 illustrating flow of the gases over the suction sides 44 thereof. FIG. 5 illustrates the substantial curvature or camber of the airfoils 34 with the typical circumferentially oblique inclination of the leading edges 46 which first receive the combustion gases from the upstream nozzle. The trailing edges 48 also have circumferentially oblique inclination to discharge the combustion gases through the downstream nozzle.

Note in particular the oblique incidence angle of the combustion gases 30 which generally matches the oblique inlet angle of the airfoil leading edges, with the bank 60 and trough 62 cooperating together to conform with the incidence angle of the combustion gases for smoothly banking or turning the combustion gases for reducing the adverse affects of the horseshoe vortices.

Figure 6:
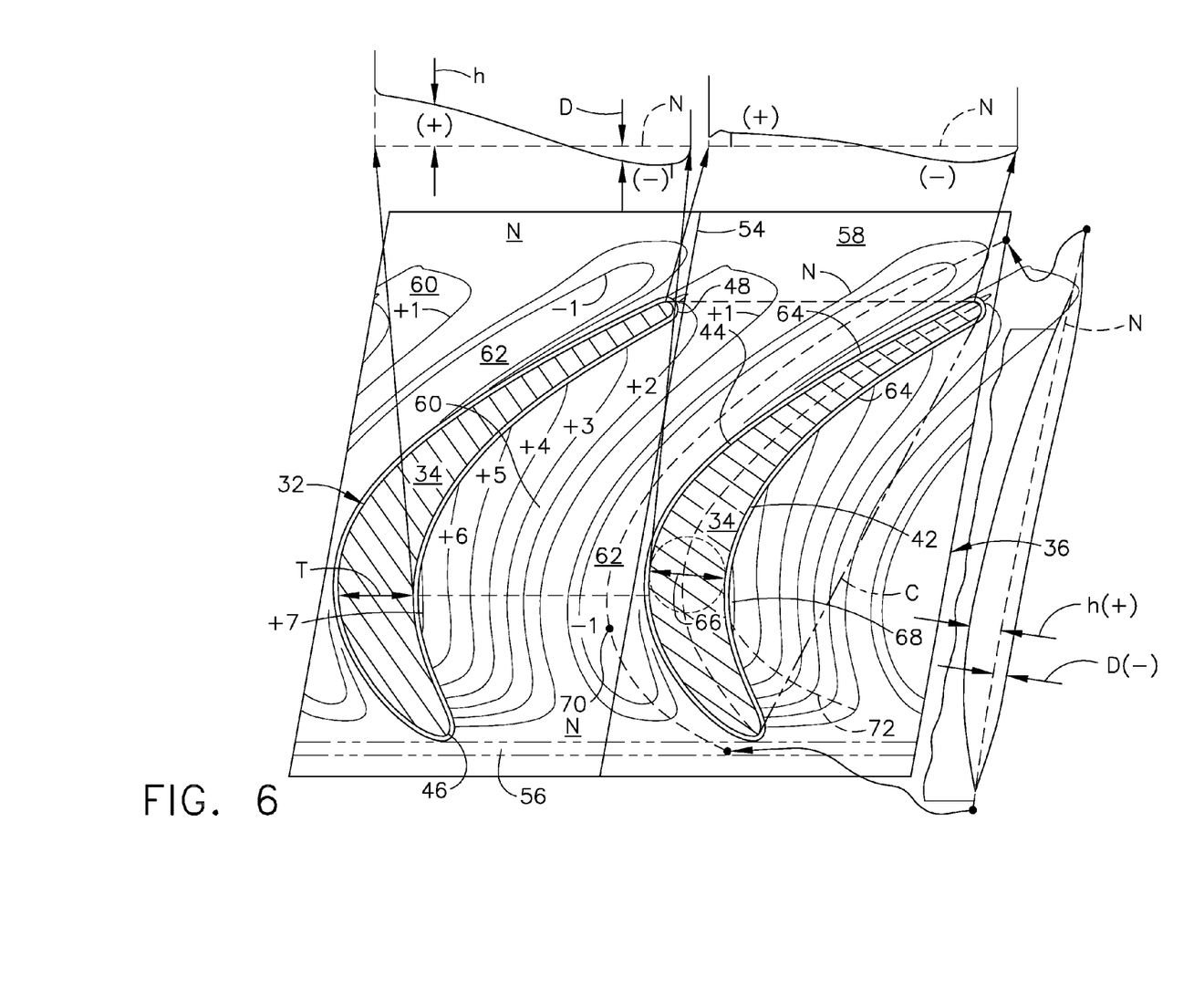
FIG. 6 is a circumferential planiform view of the exemplary turbine blades illustrated in FIG. 5 with exemplary isoclines of common radial elevation, along with circumferential and axial sectional profiles thereof.

FIG. 6 is a planiform view of two adjacent turbine blades 32 having exemplary isoclines of common radial elevation or depression relative to locally axisymmetric or circumferentially circular reference profiles collectively defining a nominal or zero elevation reference land N. The nominal land N represents the local surface configuration of the platform 36 in circular profile which would otherwise occur in a conventional axisymmetrical platform configuration, but which remains only locally upon preferential contouring thereof.

Figure 7:
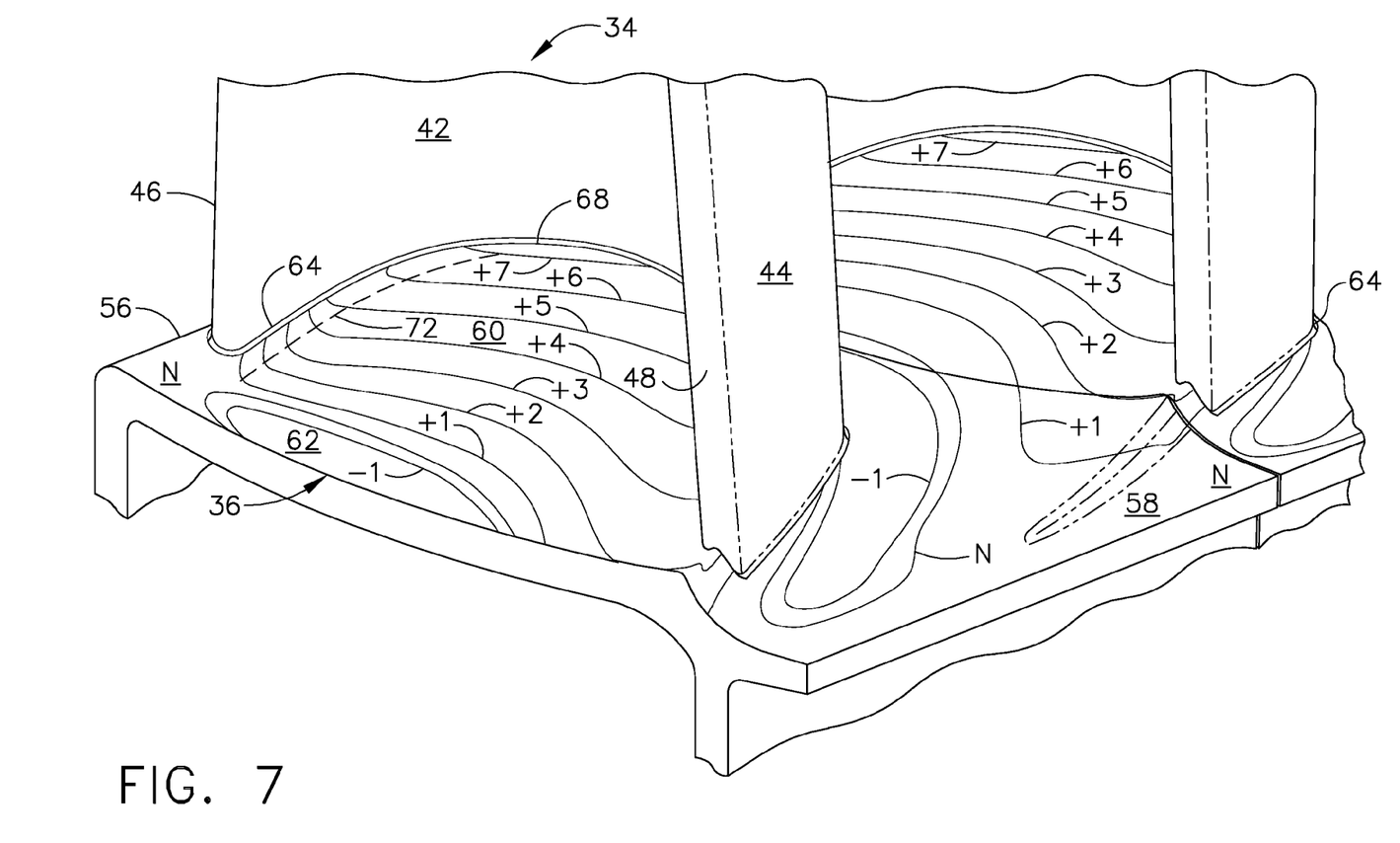
FIG. 7 is an enlarged isometric view of the turbine blades illustrated in FIG. 3 having labeled elevational isoclines therein.

FIG. 7 illustrates the isoclines in side elevation, which isoclines have relative values increasing linearly in local elevation h to slightly larger than plus seven (h=+7) relative to the nominal land N, and decreasing linearly in elevation to a depth D below the nominal land N of slightly more than minus one (D=−1).

In particular, the trough 62 commences immediately behind or axially aft of the airfoil leading edges 46 and continues aft towards the airfoil trailing edges. Correspondingly, the bank 60 also commences immediately behind or aft of the airfoil leading edges 46 but peaks in elevation further aft than the commencement of the trough 62.

It is noted that the elevated bank 60 and depressed trough 62 illustrated in FIG. 6 cooperate to preferentially contour the outer surface of the platform 36 which surface joins the opposite pressure and suction sides 42,44 of the airfoil at correspondingly small arcuate fillets 64 to provide a smooth transition in the adjoining surfaces.

As shown in FIG. 6, each airfoil 34 increases in lateral thickness T from the leading edge 46 to a hump 66 of maximum thickness as represented by the diameter of a circle inscribed between the opposite sides of the airfoil. This hump 66 is also conventionally referred to as the high-C location of the airfoil, and occurs in this second stage blade design just before the midchord thereof at about 0.37 of the chord length aft from the leading edge in this specific embodiment.

Correspondingly, the wide mound or curved bank 60 increases in radial elevation (h+) from both the leading and trailing edges 46,48 of the airfoil along the pressure side 42 thereof to a peak 68 of maximum elevation, with an exemplary peak value slightly greater than +7. The location of the peak 68 is closely adjacent to the hump 66, and is slightly upstream therefrom and closer to the leading edge 46 than to the midchord of the airfoil.

Correspondingly, both the bank 60 and trough 62 extend aft from the common bullnose 56 and terminate in the common aft lip 58 short of or axially forward of the trailing edge of that lip, with the nominal land N extending circumferentially between the bank and trough axially from the bullnose 56 to the aft lip 58 itself. In other words, the platform 36 may commence in axisymmetric profile in nominal value at the bullnose 56, and continue in narrow part in nominal elevation continuously aft to the lip 58, with the aft end of the lip 58 also having the conventional axisymmetric nominal value or elevation over its full circumferential width.

The laterally curved bank 60 is biased in elevation forward of the airfoil midchord and increases in elevation along the airfoil pressure side 42 to the common peak 68 with a larger gradient or slope aft from the leading edge 46 than forward from the trailing edge 48.

Note that the bank 60 increases in elevation behind the airfoil leading edge 46 from the nominal land N to the peak elevation greater than +7 with a large gradient over the first third of the chord length from the leading edge, whereas the bank 60 increases in elevation from the trailing edge 48 over the same +7 magnitude over the remaining two-thirds of the chord length from the trailing edge at a substantially shallower gradient or slope.

Correspondingly, the trough 62 has a nadir 70 of maximum depth D disposed axially forward of the peak 58 of maximum elevation at about one-quarter of the chord length from the leading edge.

FIG. 6 also illustrates the relative elevation of the bank 60 and trough 62 circumferentially between two airfoils at one cross section in the axial plane of the peak 68, and in another cross section the axial plane of the trailing edges 48. FIG. 6 further illustrates an axial cross section of the relative elevation along the centerline of the arcuate trough 62 between the forward and aft ends of the platform.

The trough 62 illustrated in FIG. 6 is shallower in depth D than the bank 60 is tall in height h by at least one half (D<h/2). For example, the peak 68 has a maximum elevation slightly greater than +7, whereas the nadir 70 has a maximum depth of about −1.5, with the maximum depth to height ratio being 0.23, or about one-quarter.

Whereas the peak 68 is locally isolated near the hump 66, the trough 62 has a generally uniform and shallow depth over substantially its entire longitudinal or axial length, with the nadir 70 being a minor variation near the leading edge end of the trough.

The wide bank 60 covers the platform 36 on the pressure side 42 of the airfoil in substantially greater surface area than the narrow trough 62. The bank 60 therefore has a substantial affect in smoothly banking or turning the incident gas flow as it turns between adjacent airfoils, with the narrow trough 62 having a locally pronounced affect on the convex suction side of the airfoils.

FIG. 6 represents a typical crescent profile of the second stage turbine airfoils 34 with the concave pressure side 42 and the convex suction side 44, and with the camber line therebetween having a correspondingly sharp or arcuate axial curvature.

FIG. 6 also illustrates that the curved and inclined bank 60 has a pronounced forward ridge 72 which defines a local peak in elevation that decreases in elevation forwardly from the maximum peak 68. The ridge 72 itself curves smoothly circumferentially or laterally away from the leading edge 46 with sharper or greater camber than that of the airfoil 34 over the axial extent of the ridge.

In this way, the bank 60 provides a local leading edge along its forward ridge 72 which cooperates with the leading edges of the airfoils themselves for preferentially receiving the incident combustion gases generally in line with the oblique incidence angle thereof.

The forward ridge 72 begins where the nominal land N joins the forward bullnose 56. The land diverges from the ridge and extends continuously axially aft between the bank 60 and trough 62 with a lateral spacing from the airfoil pressure side 42 that follows generally in parallel the concave profile thereof between the leading and trailing edges 46,48.

In this way, the nominal land N or interface between the elevated bank 60 and depressed trough 62 follows the concave contour of the airfoil pressure side 42, with the forward ridge 72 allowing the remainder of the bank 60 to similarly follow the concave contour of the pressure side 42 for effecting a smooth inclined banking turn between the adjacent airfoils.

The nominal land N on the pressure side of the airfoil is preferably closer to the lateral pressure-side splitline 54 of the platform than to the pressure side 42 itself from the leading edge 46 to the trailing edge 48. Since the bank 60 occupies most of the platform surface area on the pressure side of the airfoil, the trough 62 is limited in surface area, and located directly along the splitline 54.

Since the turbine blades 32 are manufactured individually they have corresponding individual platforms 36 which collectively adjoin each other at the corresponding splitlines 54 in the full row of turbine blades. Accordingly, each platform 36 further includes complementary portions of the bank 60 and trough 62 on the suction side 44 of each airfoil for matching the corresponding portions thereof on the next adjacent platforms in the full row of blades.

As shown in FIG. 6, the common bank 60 on the pressure side 42 of one airfoil commences behind the leading edge 46 and terminates axially aft of the trailing edge 48 on the platform of the next adjacent blade on the suction side thereof.

Similarly, the common trough 62 commences on the suction side of one airfoil behind the leading edge thereof and continues over the splitline 54 onto the next adjacent platform on the pressure side of the next blade and then continues yet again over the same splitline 54 back to the original platform on the suction side of the first airfoil.

Accordingly, the complementary portions of the bank 60 and trough 62 terminate short in the common lip 58 at the nominal land N, which itself is axisymmetric around the centerline axis of the engine.

Since the trough 62 is long and narrow, it extends generally parallel to the suction side 44 of each airfoil 34 in common depth near both the leading and trailing edges 46,48 in one platform while continuing in common depth along the splitline of the next adjacent platform. Whereas each bank 60 is divided in two complementary parts between adjacent platforms, each trough 62 is divided in three complementary parts therebetween.

Accordingly, the nadir 70 of maximum depth in each platform 36 is located on the pressure side of the corresponding airfoil 34, with the splitline 54 being located closely adjacent to the suction side 44 of the next adjacent airfoil. Nevertheless, the shallow trough 62 extends substantially in common depth along most of the suction side of each airfoil in the adjoining platforms 36, with the trough blending quickly to the nominal land of zero elevation and zero depth both at the forward bullnose 56 and at the aft lip 58.

The banked platform turbine blade configuration disclosed above has been analyzed to predict significant reduction in aerodynamic pressure losses near the blade platforms during operation. The improved pressure distribution extends from the platform over a substantial portion of the lower span of the airfoil to significantly reduce vortex strength and cross-passage pressure gradients that drive the horseshoe vortices toward the airfoil suction sides. The banked platform also decreases vortex migration toward the midspan of the airfoils while reducing total pressure loss. These benefits increase performance and efficiency of the LPT and engine.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine blade comprising:
an airfoil having laterally opposite pressure and suction sides extending in chord between opposite leading and trailing edges, and extending in span between a root and an opposite tip;
a platform integrally joined to said root of said airfoil and extending laterally from said pressure and suction sides; and
said platform being contoured in elevation from an elevated having a peak along said pressure side to a depressed trough commencing behind said leading edge and forward of said peak, with said bank and said trough having complementary portions in said platform on said suction side of said airfoil, for matching corresponding portions thereof on next adjacent platforms in a row of turbine blades.

2. A blade according to claim 1 wherein said airfoil increases in thickness from said leading edge to a hump of maximum thickness adjacent said peak and before a midchord of said airfoil.

3. A blade according to claim 2 wherein:
said platform commences at an arcuate bullnose at a forward end thereof extending inwardly from said leading edge, and terminates in a lip extending aft from said trailing edge; and
said bank and trough extend aft from said bullnose with a nominal land extending therebetween, with said complementary portions of said bank and trough terminating short in said lip.

4. A blade according to claim 3 wherein said pressure side has a concave profile, and said nominal land between said bank and trough is spaced laterally from said pressure side to follow in parallel said concave profile thereof between said leading and trailing edges.

5. A blade according to claim 4 wherein said bank increases in elevation along said pressure side to said peak with a larger gradient aft from said leading edge than forward from said trailing edge.

6. A blade according to claim 4 wherein said trough is shallower in depth than said bank is tall in height by at least one half.

7. A blade according to claim 4 wherein said bank covers said platform on said pressure side in greater surface area than said trough.

8. A blade according to claim 4 wherein said trough has a nadir of maximum depth disposed forward of said peak of maximum elevation.

9. A blade according to claim 4 wherein said bank has a forward ridge decreasing in elevation forwardly from said peak, and curving smoothly laterally away from said leading edge in sharper camber than said airfoil therealong.

10. A plurality of said turbine blades according to claim 4 arranged in row having complementary portions of said bank and trough in said platforms on said opposite pressure and suction sides of said airfoils, with each airfoil having a tip shroud integrally joined to said tip thereof.

11. A turbine blade comprising:
an airfoil having laterally opposite pressure and suction sides extending in chord between opposite leading and trailing edges, and extending in span between a root and an opposite tip;
a platform integrally joined to said root of said airfoil and extending laterally from said pressure and suction sides; and
said platform being contoured in elevation from an elevated bank adjacent said pressure side to a depressed trough, with said trough commencing behind said leading edge, and said bank having a peak further aft, wherein said platform further comprises complementary portions of said bank and trough on said suction side of said airfoil for matching corresponding portions thereof on next adjacent platforms in a row of turbine blades.

12. A blade according to claim 11 wherein said airfoil increases in thickness from said leading edge to a hump of maximum thickness before a midchord thereof, and said bank increases in elevation to a peak of maximum elevation disposed adjacent said hump.

13. A blade according to claim 12 wherein:
said platform commences at an arcuate bullnose at a forward end thereof extending inwardly from said leading edge, and terminates in a lip extending aft from said trailing edge; and
said bank and trough extend aft from said bullnose with a nominal land extending therebetween.

14. A blade according to claim 13 wherein said bank increases in elevation along said pressure side to said peak with a larger gradient aft from said leading edge than forward from said trailing edge.

15. A blade according to claim 13 wherein said trough has a nadir of maximum depth disposed forward of said peak of maximum elevation.

16. A blade according to claim 13 wherein said trough is shallower in depth than said bank is tall in height by at least one half.

17. A blade according to claim 13 wherein said bank covers said platform on said pressure side in greater surface area than said trough.

18. A blade according to claim 13 wherein said bank has a forward ridge decreasing in elevation forwardly from said peak, and curving smoothly laterally away from said leading edge in sharper camber than said airfoil therealong.

19. A blade according to claim 13 wherein said pressure side has a concave profile, and said nominal land between said bank and trough is spaced laterally from said pressure side to follow in parallel said concave profile thereof between said leading and trailing edges.

20. A blade according to claim 13 wherein said platform has a splitline at a lateral end thereof, and said nominal land is closer to said splitline than to said pressure side from said leading edge to said trailing edge.

21. A blade according to claim 13 wherein said complementary portions terminate short in said lip at said nominal land.

22. A blade according to claim 13 further comprising a tip shroud integrally joined to said airfoil tip.

23. A blade according to claim 13 wherein said airfoil is slender with a span aspect ratio greater than 3 and a thickness aspect ratio less 0.3.

24. A plurality of said turbine blades according to claim 13 arranged in a row having
complementary portions of said bank and trough in said platforms thereof on said opposite pressure and
suction sides of said airfoils.

25. A blade according to claim 11 wherein said trough extends parallel to said suction side in common depth near both said leading and trailing edges.

26. A blade according to claim 11 wherein said trough has a nadir of maximum depth in said platform on said pressure side of said airfoil.

* * * * *